United States Patent [19]

Roberts

[11] Patent Number: 4,718,188

[45] Date of Patent: Jan. 12, 1988

[54] ICE REMOVAL DEVICE

[76] Inventor: Fred W. Roberts, P.O. Box 540, Williston, N. Dak. 58801

[21] Appl. No.: 894,903

[22] Filed: Aug. 8, 1986

[51] Int. Cl.$^4$ .............................................. A01K 97/00
[52] U.S. Cl. ............................................ 43/4; 99/410
[58] Field of Search ...................... 294/131, 50.7; 43/4; 126/369; 99/410, 415, 418

[56] References Cited

U.S. PATENT DOCUMENTS

| | | | |
|---|---|---|---|
| 2,213,058 | 8/1940 | Sweet et al. | 135/20 R |
| 2,466,595 | 4/1949 | Korman | 135/20 R |
| 2,479,250 | 8/1949 | Mote | 135/20 R |
| 2,725,066 | 11/1955 | Estes et al. | 135/20 R |
| 2,877,595 | 3/1959 | Stewart | 43/4 |
| 3,722,940 | 3/1973 | Misjak | 43/4 |
| 3,747,253 | 7/1973 | Gangi et al. | 43/4 |
| 3,863,660 | 2/1975 | Glaeser | 135/20 R |
| 4,179,147 | 12/1979 | Mendenhall | 294/50.7 |

FOREIGN PATENT DOCUMENTS 1436059  3/1966  France ................. 135/20 R

Primary Examiner—Nicholas P. Godici
Assistant Examiner—Karen Skillman
Attorney, Agent, or Firm—Staas & Halsey

[57] ABSTRACT

A device for removing particles of ice from an ice fishing hole which includes a collapsible basket comprised of a plurality of flexible vanes mounted on the end of a rod and a sleeve slidably mounted on the rod having an expander disk mounted thereto for expanding and contracting the basket to adjust to ice fishing holes of various diameters.

14 Claims, 8 Drawing Figures

ICE REMOVAL DEVICE

BACKGROUND OF THE INVENTION

1. FIELD OF THE INVENTION

The present invention relates to an improved device for removing particles from a hole, and more particularly to a device for removing particles of ice and slush from an ice fishing hole which includes a collapsible basket which may be adjusted to fit the size of the hole.

2. DESCRIPTION OF THE RELATED ART

At the present time, most ice fishing holes are drilled with either a power or hand auger. After the hole is drilled, several inches of particles of ice, commonly called slush, remain floating on top of the water. The slush therefore must be removed from the hole in order to permit fishing through the hole in the ice.

A prior art device commonly employed to remove the slush from the ice hole comprises a saucer-shaped, perforated disk with a handle whereby the disk is inserted into the hole and the slush is dipped out with several dips. Such a device is shown in GANGI, U.S. Pat. No. 3,747,253. The use of a saucer-shaped, perforated disk to remove the slush is a timeconsuming operation and it can take more time to remove the slush than it does to drill the hole. A further problem with ice fishing holes is that as time progresses, the hole will start to freeze over at the surface and in order to utilize the hole, the ice must be broken loose again and the particles of ice removed.

SUMMARY OF THE INVENTION

It is an object of the present invention to provide a device for quickly and efficiently removing particles of ice from an ice fishing hole.

It is another object of the present invention to provide a device for removing particles of ice from an ice fishing hole which includes a collapsible basket which may be expanded or contracted to fit different sized holes.

It is a further object of the present invention to provide a device for removing particles of ice from an ice fishing hole which may be conveniently collapsed to a storage position when not in use.

It is another object of the present invention to provide a device for removing particles of ice from an ice fishing hole which is buoyant and will float in water.

It is still a further object of the present invention to provide a device for removing particles of ice from an ice fishing hole which is of economical and simple construction.

The present invention achieves the above objects by providing a device for removing particles of ice from an ice fishing hole which includes a rod having a handle on one end and a plurality of vanes in overlapping relationship forming a collapsible basket attached adjacent the other end of the rod by a vane holder. A sleeve is slidably mounted on the rod and has an expander disk mounted thereon adjacent its bottom end whereby when the sleeve is slid downwardly on the rod, the disk contacts the vanes of the collapsible basket to expand the basket. When the sleeve is slid upwardly, the vanes, which preferably are made of a plastic material, automatically return to a collapsed position. The vane holder and the disk may be perforated to permit water to flow therethrough. The vanes may be either solid or perforated.

These, together with other objects and advantages, which will be subsequently apparent, reside in the details of the construction and operation as more fully hereinafter described and claimed, reference being made to the accompanying drawings forming a part hereof, wherein like numerals refer to like parts throughout.

DESCRIPTION OF THE PREFERRED EMBODIMENTS

Figure 1:
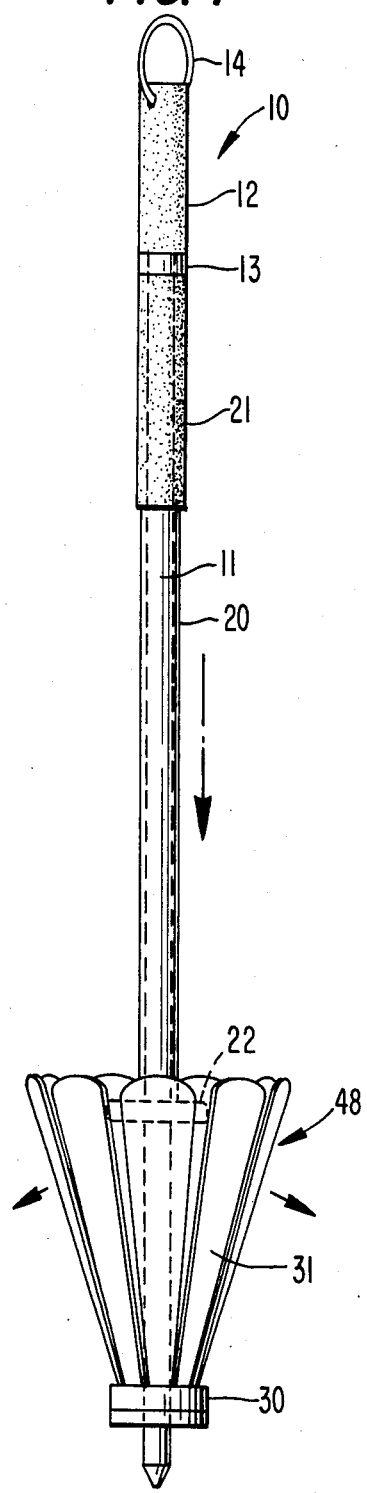
FIG. 1 is a side, elevational view showing the ice removal device of the present invention in a collapsed position.

Referring to the drawings, shown in FIG. 1 is a ice removal device, generally indicated by the numeral 10, which includes an elongated main rod 11 having a handle 12 at its upper end.

The rod 11 is provided with a tapered point 15 on its bottom end to permit the end of the rod to be used to break through thinner layers of ice. The rod 11 preferably is constructed of a hard plastic material such as ultra high molecular weight polyethylene. The handle 12 may be constructed of any suitable material such as foam rubber. A ring 13 constructed of a suitable material such as a hard plastic is mounted on rod 11 underneath handle 12. A strap 14 such as a leather thong is inserted through the top of handle 12 for ease in carrying or hanging the device during storage.

A sleeve 20 having a handle 21 at its upper end is slidably mounted on rod 11. The sleeve 20 may be constructed of a suitable material such as polyethylene. Handle 21 is constructed of any suitable material such as foam rubber. Attached to the bottom end of sleeve 20 is an expander disk 22 constructed of a suitable material such as polyethylene. Preferably disk 22 is rounded on its edges and has a plurality of holes or perforations 23 extending therethrough to permit water or other liquid to drain through the perforations.

A vane holder 30 is mounted adjacent the bottom of rod 11 for receiving and mounting a plurality of individual vanes 31 adjacent the bottom end of rod 11. The vane holder is spaced upwardly on the rod from tapered point 15. In the embodiment shown in FIG. 4, the vane holder 30 is comprised of a circular base 32 having an upstanding ring or circular wall portion 33 attached thereto by suitable means such as screws 34 to form a cup-shaped holder. The base 32 is provided with a plurality of perforations or holes 36 therethrough to permit water or other liquid to drain through the base.

Figure 8:
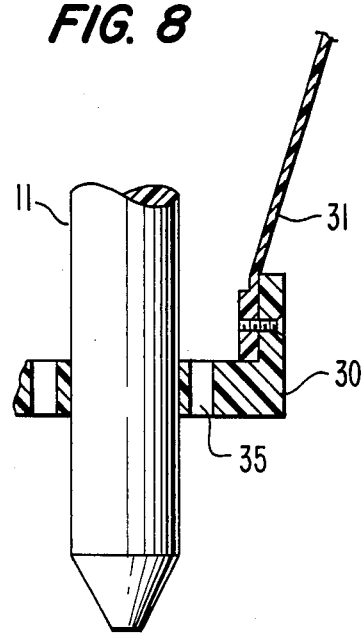
FIG. 8 is a partial, sectional view of an alternate embodiment of the vane holder of the ice removal device of the present invention.

An alternate form of vane holder 30 is shown in FIG. 8 wherein the vane holder is molded into a one-piece, cup-shaped configuration.

Figure 4:
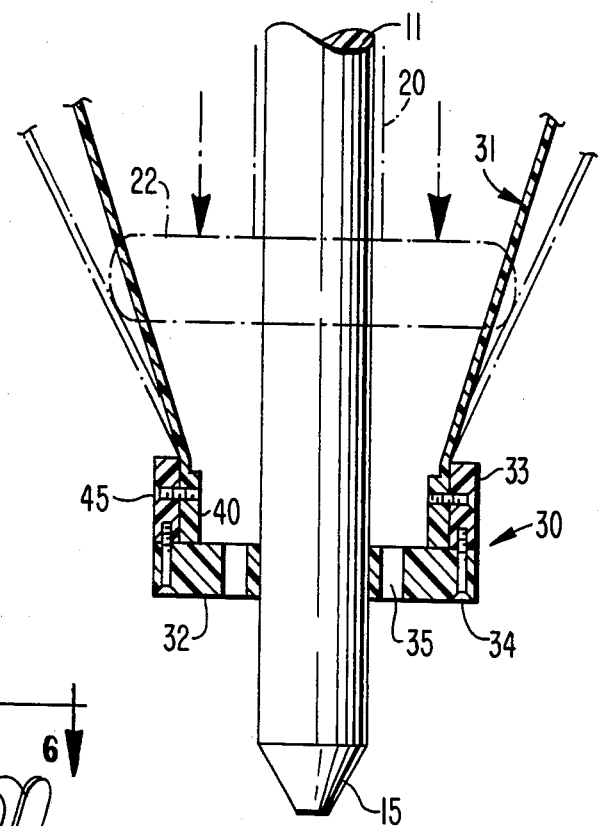
FIG. 4 is a sectional view taken along line 4—4 of FIG. 3.
Figure 7:
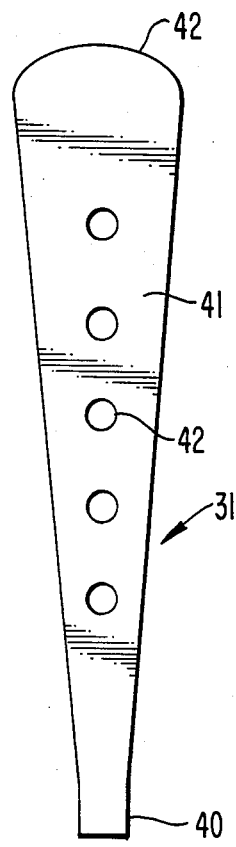
FIG. 7 is a front, elevational view of one of the vanes having perforations therein.

Each vane 31 is comprised of a thickened rectangular base portion 40 and a blade portion 41 extending upwardly therefrom, as most clearly shown in FIGS. 4 and 7. The blade portion 41 of each vane tapers outwardly from base portion 40 to the top portion 42. As shown in FIG. 7 the top portion 42 of each vane is rounded or arc-shaped. Moreover, the top of each vane may be rolled to the outside to form a bead which helps the vanes glide over rough ridges encountered on the walls of some holes.

Each vane 31 may either be of solid construction or may be provided with a plurality of perforations 42 as shown in FIG. 7 to permit water or other liquid to drain therethrough.

Figure 5:
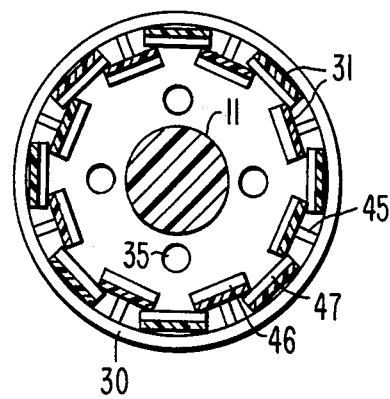
FIG. 5 is a sectional view taken along line 5—5 of FIG. 3.
Figure 6:
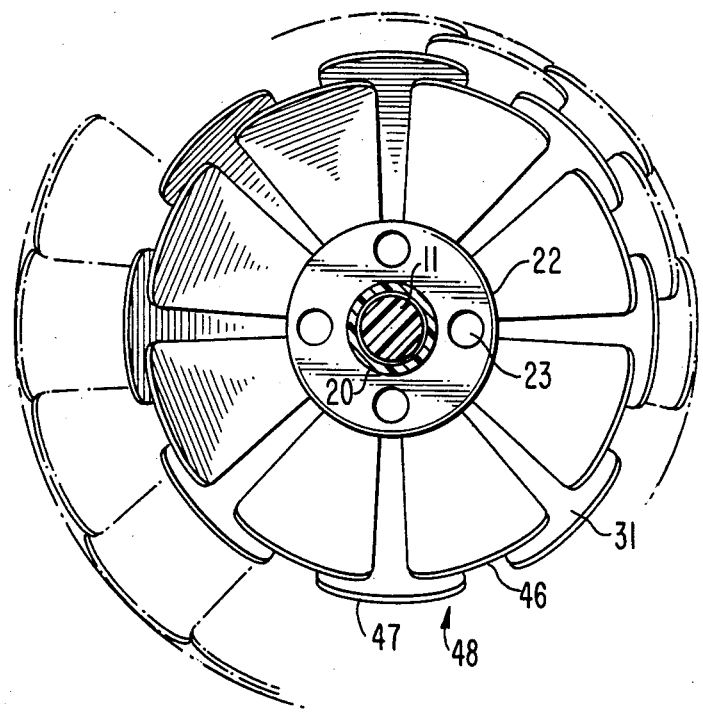
FIG. 6 is a sectional view taken along lines 6—6 of FIG. 3 with the vanes shown in an open position in phantom lines.

Referring to FIG. 4, each vane 31 is fastened at its base portion 40 through the vane holder 30 by suitable means such as screws 45. The vanes are arranged to form an inside row 46 and an outside row 47 as best shown in FIGS. 5 and 6. In the preferred embodiment, each row is comprised of eight separate vanes. The two rows of vanes are so arranged that each outside vane overlaps the outside edges of two adjacent inside vanes. This arrangement enables the vanes to form a collapsible basket which may be readily expanded and contracted. As shown in solid lines in FIG. 6, when the basket 48 is in a collapsed position, the vanes 31 considerably overlap each other whereas when the basket is in an expanded position as shown in phantom lines in FIG. 6, the vanes still overlap but to a lesser degree.

By having a plurality of individual vanes in overlapping relationship, openings are formed between the vanes to permit water to flow therethrough during use of the ice removal device while still permitting the basket 48 formed by the vanes to retain particles of ice.

The vanes preferably are constructed of plastic material which has high impact, durability and nil water absorption properties while yet being flexible enough to permit each vane to bend adjacent its base portion during expansion and contraction of the basket 48. A suitable plastic material is polyethylene. All the main parts of the ice removal device of the present invention preferably are made from a plastic material which has nil water absorption properties. Such absorption properties are critical because even if water freezes on the surfaces, one operation of the device will dislodge any ice so formed. In addition, the ice removal device is buoyant and therefore will float in water if dropped.

In operation of the ice removal device of the present invention, the device normally is in a collapsed position with the expander disk 22 just below the tops of the vanes 31 of the collapsible basket 48. If the expander disk 22 were to be positioned above the tops of the vanes 31 when in the storage position, the vanes would collapse inwardly to the point that they would have to be physically separated prior to inserting the disk 22 into the center thereof to expand the collapsible basket. In this regard, it is noted that when in the storage position as shown in FIG. 1, the sleeve handle 21 abuts against ring 13 mounted underneath the rod handle 12. Accordingly, ring 13 acts as a stop means to prevent sleeve 20 from being slid upwardly to the point where the disk 22 would be above the tops of the vanes 31.

Figure 2:
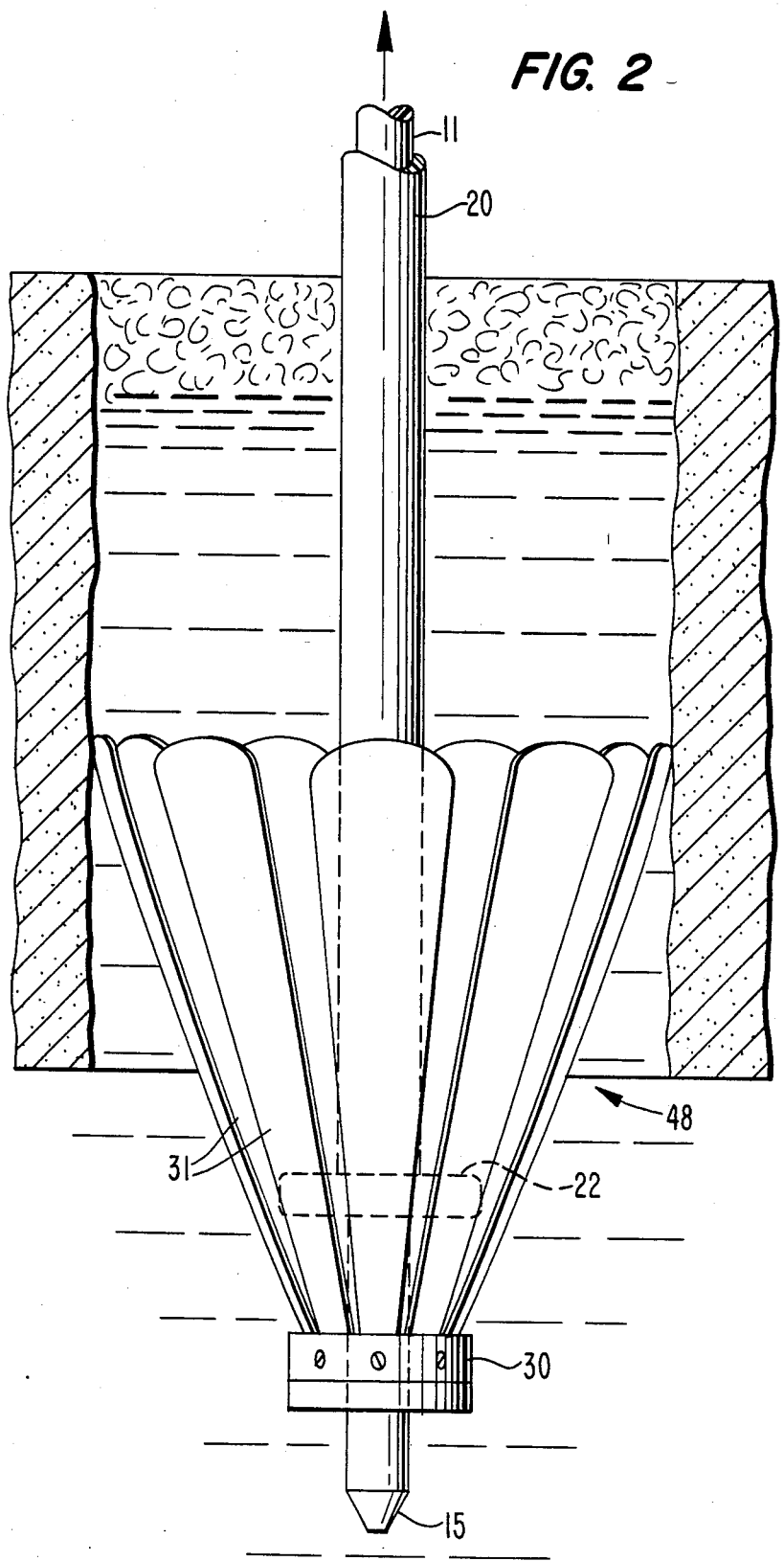
FIG. 2 is an enlarged, elevational view of the bottom portion of the ice removal device showing the vanes in an open position for removal of particles of ice from an ice fishing hole.
Figure 3:
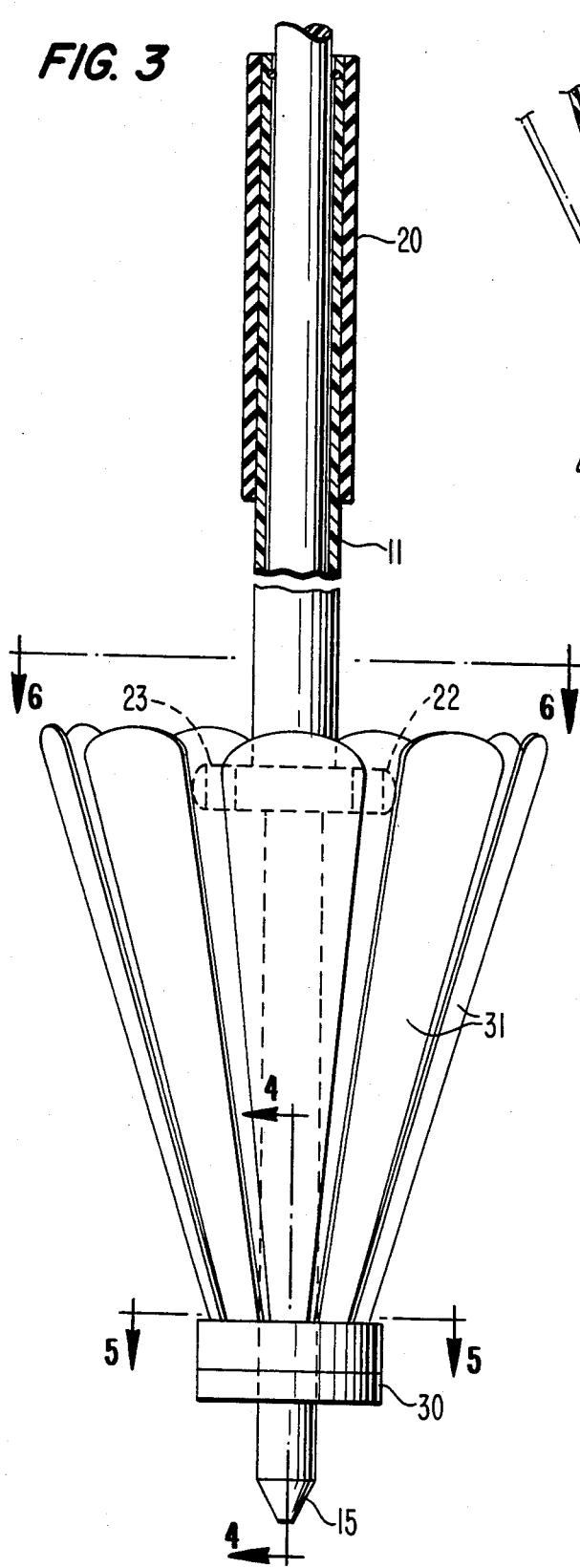
FIG. 3 is an enlarged, elevational view of a portion of the ice removal device, partially in section, showing the vanes in a collapsed position.

When it is desired to utilize the ice removal device in an ice fishing hole as shown in FIG. 2, the collapsible basket end of the device is inserted into an ice fishing hole with the basket in collapsed position below the level of any ice particles or slush floating on top of the hole. The vanes of the basket are sufficiently flexible that they will automatically expand or spread to the circumference of the hole as the basket is pulled up through the water in the hole. Alternatively, while holding the rod 11 in one hand by handle 12 to maintain the rod portion in a steady position, the sleeve 20 may be slid downwardly causing expander disk 22 to expand the vanes of the collapsible basket 48 to coincide with the circumference of the ice hole. The rounded edges of the disk facilitate smooth sliding contact with the vanes. The entire device may then be pulled upwardly to collect all the particles of ice or slush which are in the hole. The perforations in the disk 22 and the base of the vane holder 30 facilitate draining water out of the basket. In addition, the spaces between the vanes permit the water to also drain out therethrough. In the embodiment wherein the vanes themselves also have perforations, the water may also drain out through these perforations. When not in use, a bag may be placed around the collapsible basket or an elastic band may be secured around the top of the vanes of the basket to assure maintenance of the vanes in their collapsed form whereby it is easy to store and/or transport the device.

It is apparent from the above detailed description that many advantageous features are provided by the present invention. A device is disclosed for easily and conveniently removing particles of ice from an ice fishing hole in one efficient and simple operation. The collapsible basket of the device is easily adjustable to accommodate the size of a fishing hole so that multiple operations are not required to remove the particles of ice from the hole.

Since most ice augers are built to create ice fishing holes having a diameter of from 6 to 10 inches, it is important to have a readily adjustable device to accommodate the various diameter holes for efficiently and speedily removing any ice particles contained therein. Additionally, the device may be readily collapsed for convenient storage and/or transporting. If a layer of thin ice forms over the ice fishing hole, the tapered point 15 of the rod may be used to break through the layer. The device is also buoyant and therefore will float in water.

Numerous alterations and modifications of the structure herein disclosed will suggest themselves to those skilled in the art. It is to be understood, however, that the present disclosure relates to the preferred embodiments of the invention which is for purposes of illustration only and is not to be contrued as a limitation of the invention. All such modifications which do not depart from the spirit of the invention are intended to be included within the scope of the appended claims.

I claim:

1. A device for removing particles from a hole comprising:
   a main rod;
   a plurality of overlapping vanes forming a collapsible basket attached adjacent one end of said rod, said vanes being movable from a collapsed position wherein said vanes substantially overlap to a more open position wherein said vanes overlap to a lesser degree to expand said basket; and means mounted on said main rod for moving said vanes from said collapsed position to said open position.

2. The device of claim 1 wherein said means for moving said vanes comprises a sleeve slidably mounted on said rod and a disk mounted on said sleeve for contacting said vanes and wherein the degree to which said vanes are moved to said open position is controlled by the sliding movement of said sleeve and said disk as said disk contacts said vanes.

3. The device of claim 1 which includes a vane holder mounted adjacent said one end of said rod, one end of each of said vanes being attached to said vane holder.

4. The device of claim 3 wherein said vane holder has a circular base portion and an upstanding circular wall portion attached thereto, said one end of each of said vanes being attached to said circular wall portion.

5. The device of claim 1 wherein each of said vanes is perforated.

6. The device of claim 1 wherein said rod has a handle at its other end.

7. A device for removing particles from a hole comprising:
   a main rod;
   a plurality of overlapping vanes forming a collapsible basket attached adjacent one end of said rod, said vanes being movable from a collapsed position wherein said vanes substantially overlap to a more open position wherein said vanes overlap to a lesser degree to expand said basket;
   a sleeve slidably mounted on said rod and a disk mounted adjacent one end of said sleeve for contacting said vanes and for moving said vanes from said collapsed position to said open position and for controlling the degree to which said vanes are moved to said open position; and
   a vane holder mounted adjacent said one end of said rod, one end of each of said vanes being attached to said vane holder.

8. The device of claim 7 wherein both said rod and said sleeve have a handle mounted at their other ends whereby when said vanes are moved to a collapsed position said sleeve handle contacts said rod handle to limit upward movement of said sleeve and consequently the degree to which said vanes may collapse in overlapping relation.

9. The device of claim 7 wherein both said vane holder and said disk are perforated.

10. The device of claim 7 wherein said vane holder has a circular base portion and an upstanding circular wall portion attached thereto, said one end of each of said vanes being attached to said circular wall portion.

11. The device of claim 7 wherein each of said vanes is perforated.

12. The device of claim 7 wherein said one end of said rod has a tapered point.

13. The device of claim 1 wherein said vanes are constructed of a flexible plastic material.

14. The device of claim 7 wherein said vanes are constructed of a flexible plastic material.

* * * * *